US008254474B2

(12) United States Patent
Jallon

(10) Patent No.: US 8,254,474 B2
(45) Date of Patent: Aug. 28, 2012

(54) METHOD FOR ESTIMATING THE CHARACTERISTCS OF OFDM SIGNALS

(75) Inventor: Pierre Jallon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1114 days.

(21) Appl. No.: 12/129,937

(22) Filed: May 30, 2008

(65) Prior Publication Data

US 2008/0298489 A1 Dec. 4, 2008

(30) Foreign Application Priority Data

May 31, 2007 (FR) .................................... 07 55394

(51) Int. Cl.
 *H04L 27/28* (2006.01)
(52) U.S. Cl. ...................................................... 375/260
(58) Field of Classification Search .................. 375/260, 375/130, 150, 133, 316, 343; 370/241, 252, 370/330, 328
See application file for complete search history.

(56) References Cited

U.S. PATENT DOCUMENTS

2007/0009011 A1 1/2007 Coulson
2008/0260000 A1* 10/2008 Periyalwar et al. ........... 375/133

FOREIGN PATENT DOCUMENTS

DE 102 45 039 A1 4/2004

OTHER PUBLICATIONS

Akmouche W et al: "OFDM Parameters estimation a time approach" Oct. 29, 2000,Signals Systems ADN Computers, 2000. ISBN# 0-7803-6514-3 pp. 142-146.

Jallon P. et al: "Second-Order Based Cyclic Frequency Estimates: the Case of Digital Communication Signals" Acoustics, Speech and Signal Processing, 2006. ISBN: 1-4244-0469-X.
Marchand P. et al: "Multiple hypothesis modulation classification based on cyclic cumulants of different orders" May 12, 1998 Acoustics, Speech and Signal Processing, 1998. ISBN: 0-7803-4428-6 pages 2157-2160.
Gardner W A: "Exploitation of spectral correlation in cyclostationary signals" Fourth Annual ASSP Workshop on Spectrum Estimation and Modeling, 1988 pp. 1-6.
Ishiti H et al: "OFDM Blind Parameter Identification in Cognitive Radios" Sep. 11, 2005. Personal, Indoor and Mobile Radio Communications, 2005. ISBN: 978-3-8007-29 pp. 700-705.
Peng Liu et al: "A blind time-parameters estimation scheme for OFDM in multi-path channel" Sep. 23, 2005 Wireless Communications, Networking and Moble Computing, 2005. ISBN: 0-7803-9335-X pp. 222-227.

(Continued)

*Primary Examiner* — Khai Tran
(74) *Attorney, Agent, or Firm* — Pearne & Gordon LLP

(57) ABSTRACT

This invention relates to a method for determining at least one characteristic of an OFDM signal within a received signal, characterized in that:

a plurality of cyclic correlation coefficients ($\rho^{k/(\alpha+\beta)}(\alpha)$) for the received signal is calculated (420, 520) for a correlation time difference ($\alpha$) and a plurality of cyclic frequencies $$\left(\frac{k}{\alpha+\beta}\right);$$

a discrimination function is calculated (430, 530) as a function of the amplitude of said cyclic correlation coefficients;
  said OFDM signal characteristic is deduced (440, 561, 562) as a function of at least one value of said discrimination function.

19 Claims, 5 Drawing Sheets

OTHER PUBLICATIONS

Shiuo-Hong Chen et al: "Mode detection, synchronization, and channel estimation for DVB-T OFDM receiver" Globecom '03 Dec. 1, 2003, pp. 2416-2420, ISBN: 0-7803-7974-8 pp. 2416-2418.

Jallon et al: "Separation of instantaneous mixtures of cyclo-stationary sources" Signal Processing, Elsevier Science Publishers B.V. Amsterdam, NL, vol. 87 ISSN: 0165-1684, May 21, 2007.
French Search Report Jun. 21, 2008.

* cited by examiner

METHOD FOR ESTIMATING THE CHARACTERISTCS OF OFDM SIGNALS

TECHNICAL DOMAIN

The present invention relates to the domain of blind or semi-blind estimation of characteristics of OFDM signals. It is used particularly in cognitive radio systems and in the field of OFDM signal reception.

STATE OF PRIOR ART

The increasing congestion of the spectrum has made it necessary to envisage communication systems capable of coexisting with previously allocated frequency band systems called primary systems. A large amount of research is currently being made on two coexistence strategies. The first consists in using a very low signal level due to a very strong spectrum spreading, which is the method used for Ultra Wide Band (UWB) systems. The second consists in using, according to an opportunistic manner, part of the spectrum that is occasionally or temporarily unoccupied, that is the way of cognitive radio. A description of cognitive radio is given in the founding thesis by J. Mitola entitled <<Cognitive radio: an integrated agent architecture for software defined radio >>, Royal Institute of Technology, Stockholm, PhD Dissertation, May 8, 2000.

The principle of cognitive radio has been used particularly for the development of Wireless Regional Area Networks (WRAN). These networks are currently undergoing a standardization procedure within the IEEE 802.22 work group. More precisely, this standard currently being elaborated proposes to make cognitive use of vacant UHF and VHF bands to make a point to point wireless connexion in a WRAN network. In particular, it is envisaged that UHF bands allocated to the television system by DVB-T (Digital Video Broadcast-Terrestrial) channels can be used for this purpose. The DVB-T standard uses an OFDM (Orthogonal Frequency Division Multiplexing) modulation to transmit compressed video/audio streams. An introduction to IEEE standard 802.22 is given in the article by C. Cordeiro et al. entitled <<IEEE 802.22: an introduction to the first wireless standard base on cognitive radios >>, published in the Journal of Communications, Vol. 1, No. 1, April 2006, pp. 38-47.

Before being able to emit in a given UHF band, a WRAN network emitter must be able to determine whether or not an OFDM signal is present in this band. A simple power detector like that recommended in the above mentioned article is incapable of reliably obtaining this information, particularly in case of a low signal-to-noise ratio.

Furthermore, the terminals of a cognitive radio system may use OFDM modulation themselves, which is the case for WRAN networks. When changing frequency band, for example due to unavailability of the band usually used, the receiver must know the new band and more generally, new transmission parameters used by the emitter. If the cognitive radio system enables a frequency change at the sole initiative of the emitter, the receiver has to make a blind or semi-blind estimation of these parameters. A blind estimation means that the receiver has no a priori knowledge of these parameters. A semi-blind estimation means that the receiver only has an a priori knowledge of some of these parameters. Transmission parameters refers to parameters necessary for demodulating an OFDM symbol, for example the length of the OFDM symbol, the length of the prefix, and the rate of information symbols.

A blind OFDM transmission parameter estimating method for a cognitive radio system is described in the article by H. Ishii et al. entitled <<OFDM blind parameter identification in cognitive radios >> published in PIRMC 2005, IEEE 16th International Symposium on Personal, Indoor and Mobile Communications, pp. 700-705. In particular, this document describes a method for estimating the length of OFDM symbol frames and their useful length making use of peaks in the autocorrelation function of the received signal. Similarly, the article by P. Liu et al. entitled <<A blind time-parameters estimation scheme for OFDM in multi-path channel >> published in Proc. 2005 Int'l Conference on Wireless Communications Networking and Mobile Computing, 23-26 Sep. 2005, Vol. 1, pp. 242-247 gives a method of making a blind estimation of the total length of an OFDM symbol and its useful length making use of peaks in said autocorrelation function.

However, the above-mentioned estimating methods do not give a reliable result for a low signal-to-noise ratio.

A first purpose of this invention is to propose a method for determining whether or not an OFDM signal is present in a frequency band of interest with high reliability, even under low signal-to-noise ratio conditions.

A second purpose of this invention is to propose a method for performing a blind or semi-blind estimation of transmission parameters of an OFDM signal, which is reliable even under low signal-to-noise ratio conditions.

PRESENTATION OF THE INVENTION

The present invention is defined by a method for determining at least one characteristic of an OFDM signal within a received signal according to which:
a plurality of cyclic correlation coefficients of the received signal are calculated for a correlation time difference and a plurality of cyclic frequencies;
a discrimination function is calculated as a function of the amplitude of said cyclic correlation coefficients;
said OFDM signal characteristic is deduced as a function of at least one value of said discrimination function.

Advantageously, the discrimination function is the sum of the squares of said cyclic correlation coefficients. It may be calculated using the following equation:

$$J(\tilde{\alpha}, \tilde{\beta}) = \sum_{k=0}^{K-1} \left| \frac{1}{U} \sum_{u=0}^{U-1} s(u)s^*(u-\tilde{\alpha})e^{-2i\pi\frac{k}{\tilde{\alpha}+\tilde{\beta}}} \right|^2$$

where s(u), u=1, . . . , U are samples of the received signal, sampled at the sampling period $T_e$, $\tilde{\alpha}$ is said time difference expressed in sampling period(s), $\tilde{\beta}$ is a cyclic prefix duration expressed in sampling period(s), the summation on k being taken on said plurality of cyclic frequencies, or in an equivalent manner and with the same conventions by:

$$J(\tilde{\alpha}, \tilde{\beta}) = \sum_{k=0}^{K-1} \left| \frac{1}{U} \sum_{u=0}^{U-1} s^*(u)s(u+\tilde{\alpha})e^{-2i\pi\frac{k}{\tilde{\alpha}+\tilde{\beta}}} \right|^2$$

According to a first embodiment, said characteristic is the absence/presence information of said OFDM signal.

If the useful duration and the cyclic prefix duration of OFDM symbols in the OFDM signal are known a priori, the discrimination function is calculated for the value of $\tilde{\alpha}$ equal to said known useful duration and the value of $\tilde{\beta}$ equal to said known value of the prefix duration, expressed in sampling period(s).

In the case of a blind or semi-blind estimation, the discrimination function may be calculated for a set of possible discrete values of $\tilde{\alpha}$ and/or $\tilde{\beta}$, or for an interval of these values.

If the useful duration and the cyclic prefix duration of the OFDM symbols of the OFDM signal are known a priori, the value of the discrimination function is compared with a predetermined threshold value. It is then concluded that there is an OFDM signal present if it exceeds the threshold value and otherwise that there is no OFDM signal.

In the case of a blind or semi-blind estimation, the maximum of the discrimination function is determined and this maximum is compared with a predetermined threshold value. It is then concluded that an OFDM signal is present if this maximum exceeds the threshold value, and otherwise that there is no OFDM signal.

For low signal-to-noise ratios, the predetermined threshold value is advantageously calculated as a function of the $$\frac{U}{\sigma^4}$$

ratio where K is the number of cyclic frequencies and $$\sigma^2 = \frac{1}{U}\sum_{u=0}^{U-1}|x(u)|^2.$$

According to a second embodiment, said characteristic is a time parameter of the OFDM signal, typically the cyclic prefix length or the total length of the OFDM symbols of said OFDM signal.

If the useful duration and the cyclic prefix duration of the OFDM symbols of the OFDM signal are known a priori, then the maximum of the discrimination function is calculated for a plurality of possible discrete values of $\tilde{\alpha}$ and/or $\tilde{\beta}$ or the maximum of the discrimination function for an interval of these values.

Preferably, the useful length and the prefix length of the OFDM symbols are estimated jointly as the values $\tilde{\alpha}T_e$ and $\tilde{\beta}T_e$ respectively that determine said maximum of the discrimination function.

Advantageously, the received signal is first submitted to a filtering step for removing at least one interfering spectral line before calculating said plurality of cyclic correlation coefficients.

BRIEF DESCRIPTION OF THE DRAWINGS

Other characteristics and advantages of the invention will become clear after reading a preferred embodiment of the invention with reference to the attached figures among which.

DETAILED PRESENTATION OF PARTICULAR EMBODIMENTS

In the following, we will consider the terminal of a radio system that needs to determine a characteristic of an OFDM signal. Characteristics in this case mean not only OFDM transmission parameters as defined above, but also more fundamentally, the simple presence/absence information for an OFDM signal in a given band. For example, the terminal in question may be an emitter in a WRAN network searching for an available band in the DVB-T spectrum, or an OFDM receiver in a cognitive or non-cognitive radio network.

In general, an OFDM signal may be written as follows after reception in base band:

$$s_a(t) = \frac{\sqrt{E}}{N}\sum_{k} g(t-k(N+D)T_c)e^{2i\pi\Delta ft} \cdot \sum_{n=0}^{N-1} a_{n+kN}e^{2i\pi\frac{n}{NT_c}(t-DT_c-k(N+D)T_c)} \quad (1)$$

where E is the power of the signal, N is the number of carriers of the OFDM multiplex, $a_n$ are information symbols belonging to a modulation alphabet, typically BPSK, QPSK or QAM, $1/T_c$ is the rate of information symbols, D is the size of the cyclic prefix expressed as a number of information symbols, g(t) is a shaping pulse of OFDM symbols with a time support $[0,(N+D)T_c]$ designed to apodise the signal spectrum, and $\Delta f$ is a carrier residue due to imperfection of the RF demodulation.

Figure 1:
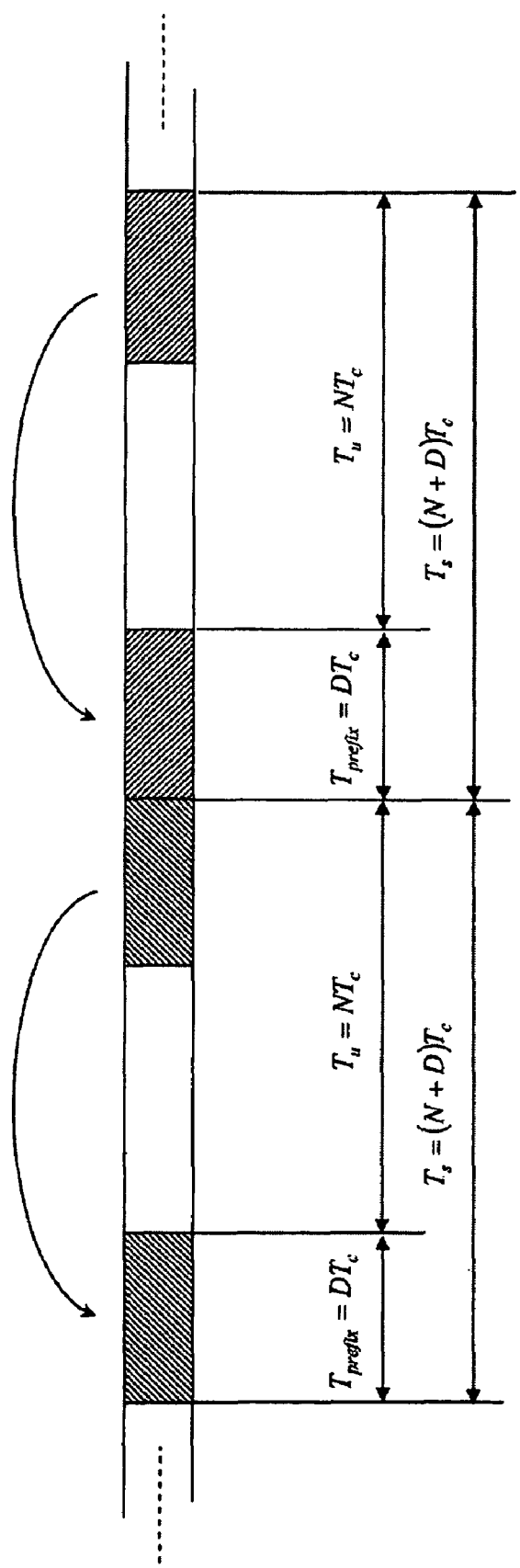
FIG. 1 diagrammatically represents an OFDM signal.

An OFDM signal is shown diagrammatically in FIG. 1. It is composed of a sequence of OFDM symbols with a total duration $(N+D)T_c$, each symbol having a useful duration $NT_c$ and a guard interval with duration $T_{prefix}=DT_c$ in which the cyclic prefix is located. Remember that conventionally, the cyclic prefix is a copy of the end of the OFDM symbol within the guard interval, the purpose of the guard interval being to eliminate inter-symbol interference (ISI).

In equation (1), we have ignored the response of the transmission channel. In practice, for a multi-path type channel, the OFDM signal received can be written as:

$$s'_a(t) = \sum_{\ell=0}^{L-1} \lambda_\ell s_a(t-\tau_\ell) + w(t) \quad (2)$$

where L is the number of channel paths, $\tau_\ell$ and $\lambda_\ell$ are signal propagation times and signal attenuations on the different paths, w(t) is an additive centred gaussian white noise.

The autocorrelation function of the received signal can then be expressed as follows, retaining the formulation (1):

$$Rs_a(t,\tau)=E\{s_a(t)s^*_a(t-\tau)\} \quad (3)$$

where E{·} denotes the mathematical expectancy. It can then be shown that:

$$Rs_a(t, \tau) = \frac{E}{N}\delta(\tau - NT_c)e^{2i\pi\Delta ft} \qquad (4)$$
$$\sum_k g(t - k(N+D)T_c)g(t - \tau - k(N+D)T_c) + \frac{E}{N}\delta(t)$$

where $\delta(.)$ denotes the Dirac distribution. Note that apart from the trivial case $\tau=0$, the equation (4) only has null values for an offset $\tau=NT_c$, which is understandable in that the OFDM signal does not have any periodicity other than the one due to repetition of the cyclic prefix. For this offset value:

$$Rs_a(t, NT_c) = \qquad (5)$$
$$\frac{E}{N}e^{2i\pi\Delta f\tau}\sum_k g(t - k(N+D)T_c) \cdot g(t - NT_c - k(N+D)T_c)$$

It will be noted that the $Rs_a(t,NT_c)$ function is invariable by translation of $(N+D)T_c$ and consequently the $s_a$ signal is cyclostationary. In other words, the spectrum of $Rs_a(t,NT_c)$ is a comb of lines spaced by the interval $$\frac{1}{(N+D)T_c}.$$

When the received signal is output from a multi-path channel, in other words if it can be expressed under the form (2), the above conclusions are still valid, the spectrum of lines then simply being modulated by the channel transfer function.

In all cases, the autocorrelation function $Rs_a(t,NT_c)$ can be broken down using the following Fourier series:

$$Rs_a(t, NT_c) = \sum_k r_a^k e^{2i\pi\frac{kt}{(N+D)T_c}} \qquad (6)$$

In practice, due to the finite size of the correlation window, the $Rs_a(t,\tau)$ function does not have a support in $\tau$ simply reduced to the straight line $\tau=NT_c$, but is spread along the $\tau$ axis. However, replacement of the $\delta(\tau-NT_c)$ function by an arbitrary $h(\tau)$ function still leads to a periodic autocorrelation function with period $(N+D)T_c$. Regardless of the value of $\tau$, the function $Rs_a(t,\tau)$ may be broken down using a Fourier series:

$$Rs_a(t, \tau) = \sum_k r_a^k(\tau) e^{2i\pi\frac{kt}{(N+D)T_c}} \qquad (7)$$

in which the Fourier coefficients $r_a^k(\tau)$, also called the cyclic correlation coefficients, depend on the time offset $\tau$. The frequencies $$\frac{k}{(N+D)T_c}$$

are called cyclic frequencies.

While estimating methods according to the state-of-the-art take place in two steps, firstly by estimating the useful length $T_u=NT_c$ and then the total length $T_s=(N+D)T_c$ of the OFDM symbols, a joint estimation of these parameters, which is more resistant to noise, can advantageously be performed.

To achieve this, consider once again the autocorrelation function of the received signal, $Rs_a(t,\tau)$, and add cyclic correlation coefficients $\rho_a^{k/(\alpha+\beta)}(\tau)$ defined as follows:

$$\rho_a^{k/(\alpha+\beta)}(\tau) = \lim_{T\to\infty}\frac{1}{T}\int_0^T RS_a(t, \tau)e^{-2i\pi\frac{kt}{\alpha+\beta}} \qquad (8)$$
$$= \left\langle RS_a(t, \tau)e^{-2i\pi\frac{kt}{\alpha+\beta}}\right\rangle_t$$

where $$\frac{k}{\alpha+\beta}, k \in Z$$

are cyclic frequencies and $\langle.\rangle_t$ denotes the time average. The autocorrelation function is then broken down as follows:

$$RS_a(t, \tau) = \sum_k \rho_a^{k/(\alpha+\beta)}(\tau)e^{2i\pi\frac{kt}{\alpha+\beta}} \qquad (9)$$

A discrimination function is defined as follows:

$$J(\alpha, \beta) = \sum_{k=0}^{K-1}|\rho_a^{k/(\alpha+\beta)}(\alpha)|^2 \qquad (10)$$

where K is an integer value greater than 1 indicating the number of cyclic frequencies to be taken into account in the estimation. This discrimination function is used to determine if, for a given time difference $\tau=\alpha$, the autocorrelation function has peaks repeated with an interval $\alpha+\beta$, as a function of time.

In the presence of an OFDM signal with parameters $T_u=NT_c$ and $T_s=(N+D)T_c$, the discrimination function $J(\alpha,\beta)$ will have a maximum J for $\alpha=NT_c$ and $\beta=DT_c$. This maximum will be significantly greater than the maximum $J_0$ that would be achieved by the function $J(\alpha,\beta)$ in the lack of an OFDM signal.

The discrimination function $J(\alpha,\beta)$ is used to determine if an OFDM signal is present in the received signal, and, in the affirmative, to estimate the time parameters. This estimation may be blind or semi-blind: if the terminal knows one or more parameter(s) a priori, the estimation of the other parameters becomes easier. For example, if the terminal knows the length $T_u$ of OFDM symbols, the discrimination function will be easy to maximize according to $\beta$, namely:

$$J(T_u, \beta) = \sum_{k=0}^{K-1}|\rho_a^{k/(T_u+\beta)}(T_u)|^2 \qquad (11)$$

Figure 2:
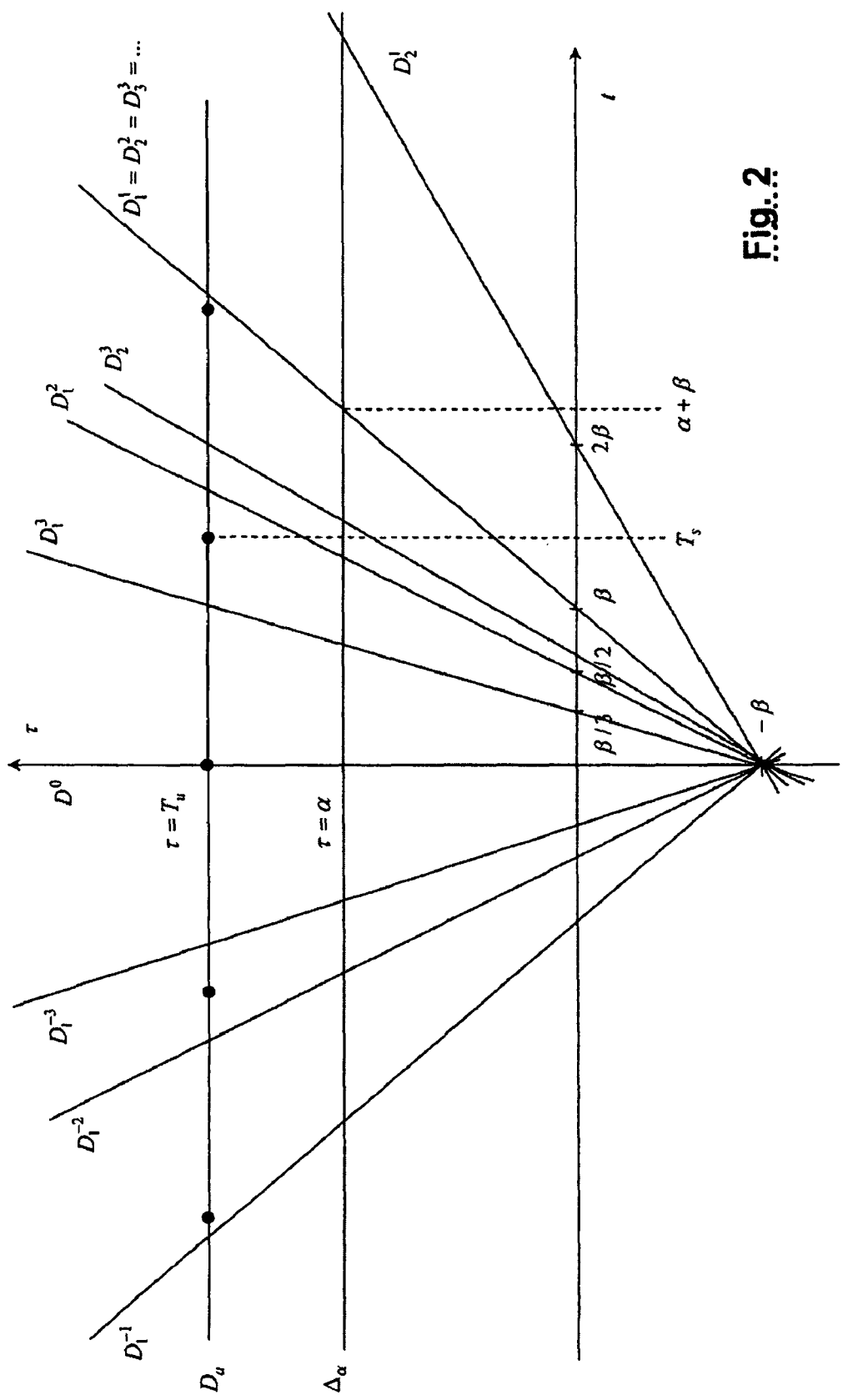
FIG. 2 gives a graphic interpretation of a discrimination function useful for implementation of the invention.

FIG. 2 gives a graphic interpretation of the discrimination function $J(\alpha,\beta)$.

The figure shows the plane $(t,\tau)$ in which the autocorrelation function $Rs_a(t,\tau)$ is defined.

In the ideal case of an OFDM $s_a$ signal with no noise, with well-defined parameters $T_u=NT_c$ and $T_s=(N+D)T_c$, the autocorrelation function $Rs_a(t,\tau)$ has a support limited to points of period $T_s$ on the horizontal straight line $D_a$ defined by the equation $\tau=T_u$.

As a general rule, the autocorrelation function of the received signal has an arbitrary support in which there are some peaks. The discrimination function can be used to test if this distribution of peaks reveals the presence of an OFDM signal, and if it does, to determine the time parameters.

The points in the plane corresponding to the cyclic frequency $$\frac{k}{\alpha+\beta},$$

$k \in \{-K, \ldots, 0, \ldots, K\}$ form a periodic network of straight lines $D_n^k$ with slopes $\pm k/n$, where n, a positive integer, is the index of the period along the t axis. Indeed, for a given value $\alpha$, points corresponding to this cyclic frequency belong to the horizontal straight line $\Delta_\alpha$ defined by the equation $\tau=\alpha$ and their abscissas are $$\pm n \frac{\alpha+\beta}{k}.$$

In the special case of a null frequency $k=0$, the network of straight lines $D_n^0$ is degenerated and reduces to the single vertical straight line $D^0$ with equation $t=0$.

Figure 3:
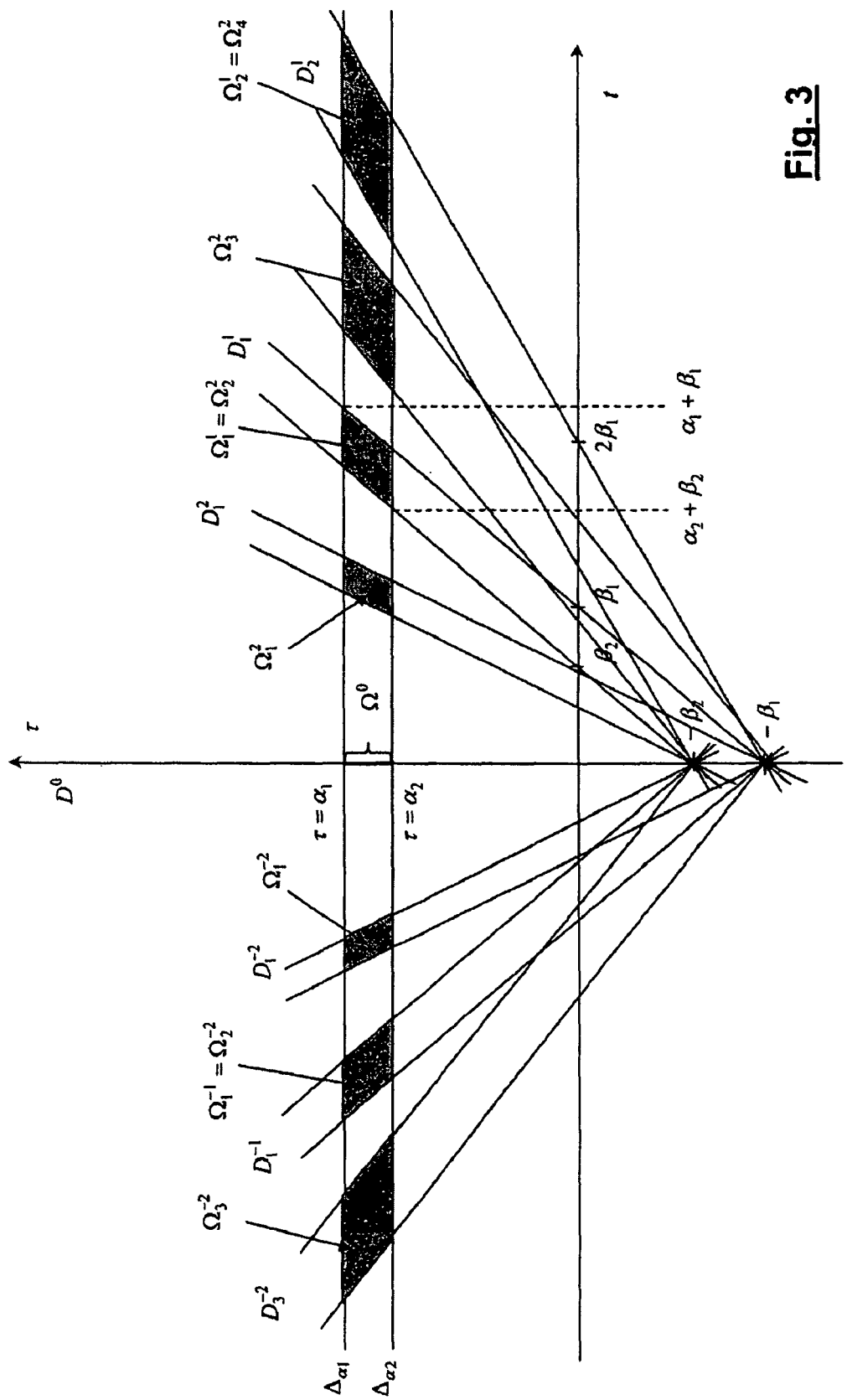
FIG. 3 represents the support zones of the autocorrelation function involved in the calculation of the discrimination function for different cyclic frequencies.

We will now assume that we are searching for the maximum J of the discrimination function $J(\alpha,\beta)$ over a range defined by variation intervals $[\alpha_1,\alpha_2]$ and $[\beta_1,\beta_2]$. FIG. 3 illustrates the zones $\Omega_n^k$ in the plane $(t,\tau)$ that contribute to $J(\alpha,\beta)$ for the first values of k ($k=0, 1, 2$). It will be noted that the method for estimating the $\alpha$ parameter according to the state-of-the-art only takes account of the zone $\Omega^0$ in the search for a correlation peak, while the estimating method according to this invention takes account of correlation peaks in all zones $\Omega_n^k$, $k=0, \ldots, -1$; $n=1, 2, \ldots$.

Figure 4:
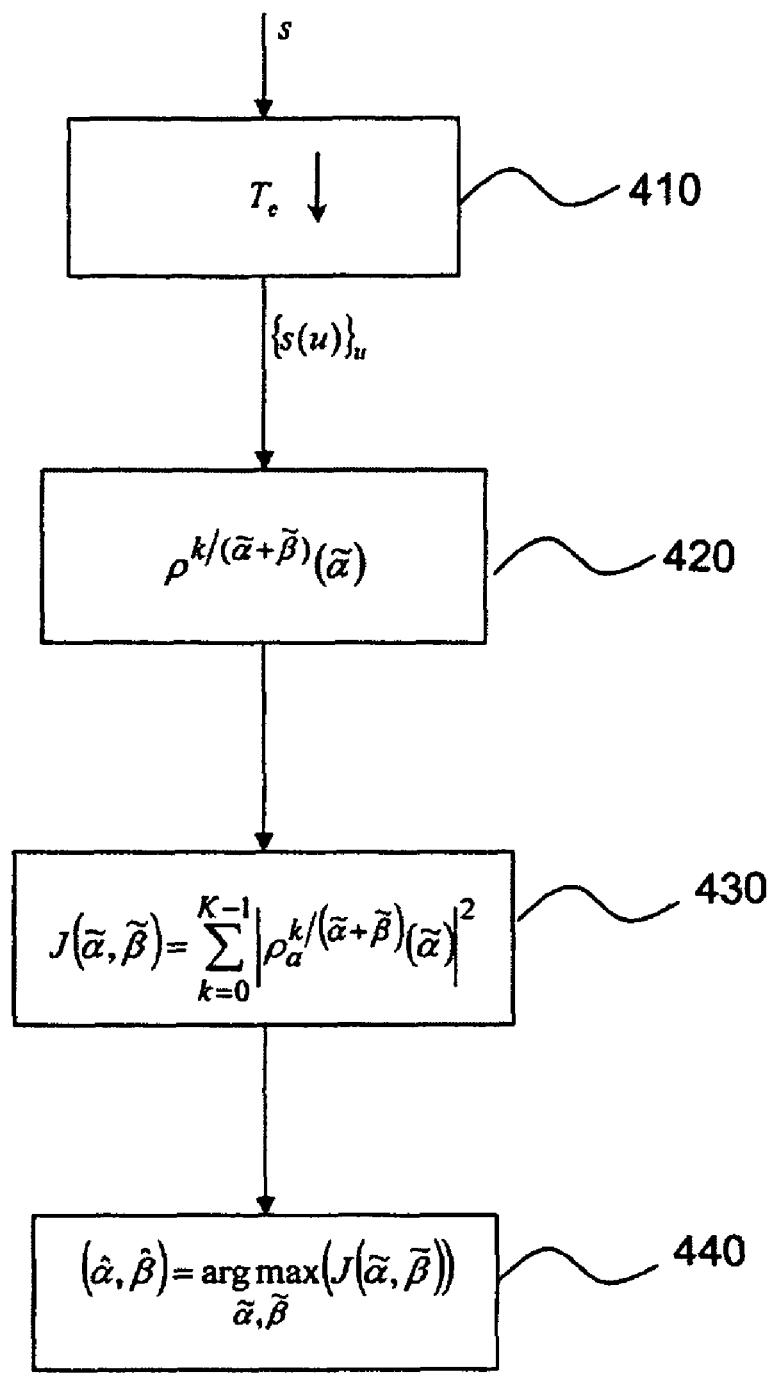
FIG. 4 represents a method of determining an OFDM signal characteristic according to a first embodiment of the invention.

FIG. 4 shows the flowchart for a method for estimating at least one transmission characteristic of an OFDM signal according to a first embodiment of the invention. More precisely, this embodiment is used for jointly estimating time parameters of the OFDM signal, such as the useful length and the prefix length of an OFDM symbol.

In the first step 410, the received signal s is sampled at the frequency of the information symbols $1/T_c$ if this frequency is known, otherwise it is sampled at the Nyquist frequency. The signal s is the base band signal, for example derived from a base band modulation of the RF signal of a UHF band of interest.

The result is thus a sequence of samples $\{s(u)\}_u$.

The cyclic correlation coefficients of the received signal are calculated in step 420, using equation (8) namely:

$$\rho^{k/(\alpha+\beta)}(\alpha) = \langle Rs(t,\alpha)e^{-2i\pi\frac{kt}{\alpha+\beta}}\rangle_t \quad (12)$$

In practice, the autocorrelation function $Rs(t,\alpha)$ is calculated over a finite window length U, starting from the sampled signal, namely:

$$\rho^{k/(\tilde{\alpha}+\tilde{\beta})}(\tilde{\alpha}) = \frac{1}{U}\sum_{u=0}^{U-1} s(u)s^*(u-\tilde{\alpha})e^{-2i\pi\frac{k}{\tilde{\alpha}+\tilde{\beta}}} \quad (13)$$

in which the reduced values $$\tilde{\alpha} = \frac{\alpha}{T_e} \text{ and } \tilde{\beta} = \frac{\beta}{T_e}$$

are defined, $T_e$ being the sampling period. In step 430, we deduce the discrimination function starting from the equation (10), namely:

$$J(\tilde{\alpha},\tilde{\beta}) = \sum_{k=0}^{K-1} \left| \frac{1}{U}\sum_{u=0}^{U-1} s(u)s^*(u-\tilde{\alpha})e^{-2i\pi\frac{k}{\tilde{\alpha}+\tilde{\beta}}}\right|^2 \quad (14)$$

Equation (14) may be written equivalently by a simple translation of $\alpha$:

$$J(\tilde{\alpha},\tilde{\beta}) = \sum_{k=0}^{K-1} \left| \frac{1}{U}\sum_{u=0}^{U-1} s^*(u)s(u+\tilde{\alpha})e^{-2i\pi\frac{k}{\tilde{\alpha}+\tilde{\beta}}}\right|^2 \quad (15)$$

It will be noted that summation on the cyclic frequencies in (14) and (15) is limited to positive frequencies from 0 to K. Alternately, the summation may apply to negative frequencies, or at the same time to negative and positive frequencies, for example from $-K$ to K, without going outside the scope of the invention.

The parameters $\hat{\alpha}$ and $\hat{\beta}$ that maximize the discrimination function are determined in step 440, as follows:

$$(\hat{\alpha},\hat{\beta}) = \underset{\substack{\tilde{\alpha}\in[\tilde{\alpha}_1,\tilde{\alpha}_2] \\ \tilde{\beta}\in[\tilde{\beta}_1,\tilde{\beta}_2]}}{\arg\max}(J(\tilde{\alpha},\tilde{\beta})) \quad (16)$$

$\hat{\alpha}$ and $\hat{\beta}$ are the estimates of the useful length and the prefix length of the OFDM symbol, respectively.

It should be noted that the calculation of the discrimination function and its maximum may be applied to a discrete set of parameter values. This will often be the case in practice, because the primary systems to be tested only use a limited number of possible parameters.

Figure 5:
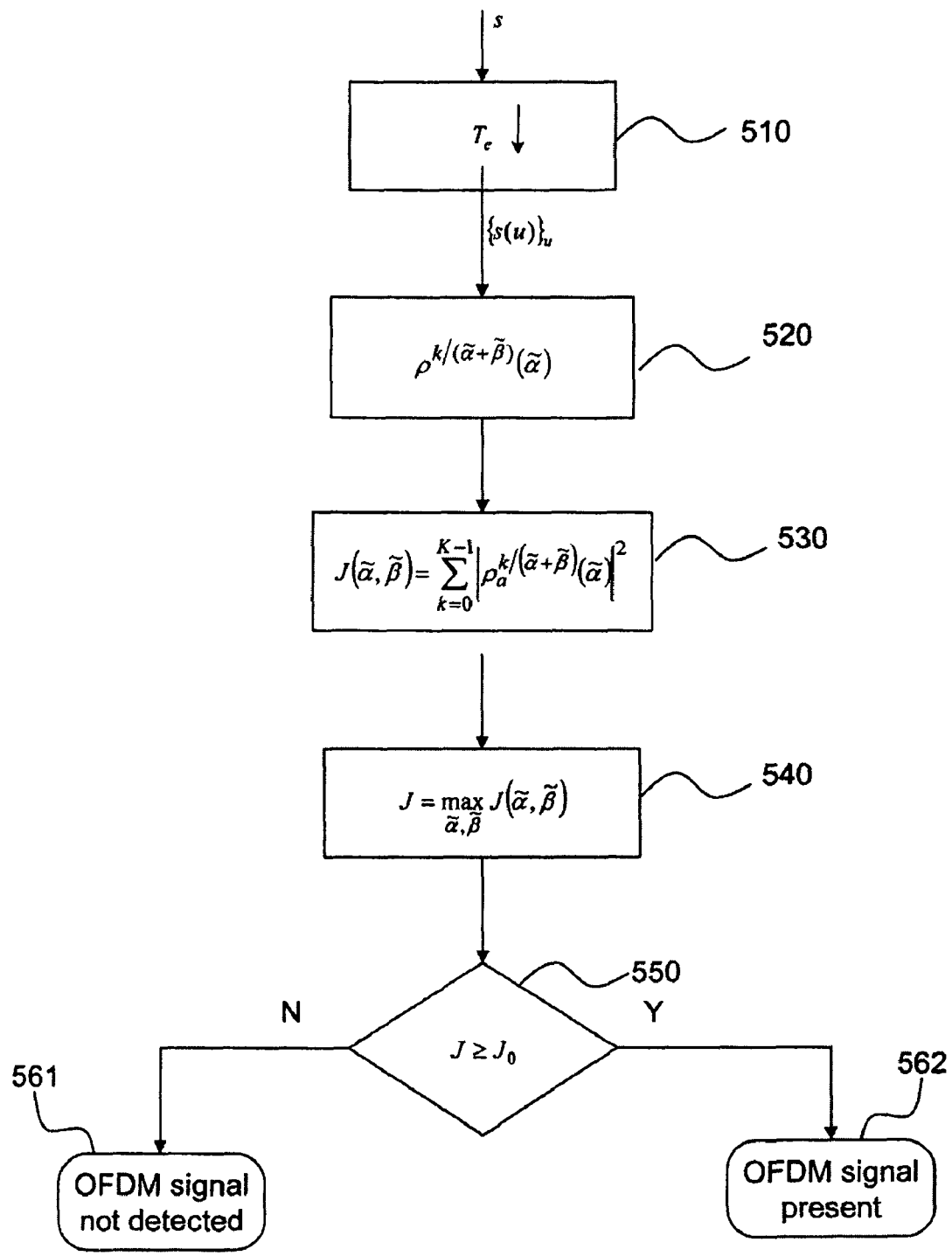
FIG. 5 represents a method of determining an OFDM signal characteristic according to a second embodiment of the invention.

FIG. 5 shows the flowchart for a method of estimating a transmission characteristic of an OFDM signal according to a second embodiment of the invention. More precisely, this embodiment is used to determine whether an OFDM signal is present in a determined frequency band.

In step 510, the received signal is sampled.

In step 520, the cyclic correlation coefficients are calculated.

In step 530, several cases can be considered:
if the parameters $T_u=NT_c$ and $T_{prefix}=DT_c$ are already known, then all that is necessary is to calculate the $J(\tilde{\alpha},\tilde{\beta})$ function for the pair of values $\tilde{\alpha}=N$, $\tilde{\beta}=D$. We then preferably choose a spectral truncation length $K<N/D$ in the discrimination function;

if the value of one of the parameters is known, for example, then all that is necessary is to calculate the $J(\tilde{\alpha},\tilde{\beta})$ function for the remaining parameter or for a set of possible values of the remaining parameter;

if it is known that the pair of parameters $(\tilde{\alpha}, \tilde{\beta})$ necessarily belongs to a set of discrete values, then it is sufficient to calculate $J(\tilde{\alpha},\tilde{\beta})$ for these values;

if there is no information about $\tilde{\alpha}$ and $\tilde{\beta}$, the function $J(\tilde{\alpha}, \tilde{\beta})$ will be calculated over a range of values defined by intervals of interest $[\tilde{\alpha}_1,\tilde{\alpha}_2]$ and $[\tilde{\beta}_1, \tilde{\beta}_2]$.

It will be noted that when the calculation of $J(\tilde{\alpha}, \tilde{\beta})$ only applies to specific values of $\tilde{\alpha}$ and/or $\tilde{\beta}$, the cyclic correlation coefficients will only have to be calculated for these values.

In step 540, apart from the case in which the $\tilde{\alpha}$ and $\tilde{\beta}$ parameters are both known, the maximum J of the function $J(\tilde{\alpha}, \tilde{\beta})$ is calculated on the range or the discrete set of parameter values.

In step 550, the value J is compared with a predetermined threshold $J_0$. If $J \geq J_0$, it is concluded that an OFDM signal is present (562). Otherwise, there is no OFDM signal, or at least no OFDM signal for which time parameters have been tested, present in the frequency band considered (561).

We advantageously determine a threshold as a function of the $$\frac{U}{\sigma^4}$$

ratio where $\sigma^2$ is the noise variance. The approximation $$\sigma^2 = \frac{1}{U}\sum_{u=0}^{U-1} |x(u)|^2$$

can be used For low signal-to-noise ratios. It can be demonstrated that if $J_0$ is chosen to satisfy the equation:

$$J_0 - \frac{\sigma^4}{U}\ln\left(\sum_{j=0}^{K-1} \left(\frac{J_0 U}{\sigma^4}\right)^j \frac{1}{j!}\right) = 3,91\frac{\sigma^4}{U} \quad (17)$$

then the probability of bad detection, in other words the probability that it is concluded that there is an OFDM signal present when in fact there is not, tends towards 2% when U tends towards infinity.

This method of determining the presence/absence of an OFDM signal may be used by cognitive radio systems to decide whether or not they can transmit in a given band, particularly a UHF band of the DVB-T system.

This same method can be used for spectral police operations, particularly to detect illicit occupancy of the spectrum.

Finally, the two embodiments may be used consecutively, the second mode firstly to determine if an OFDM signal is actually present in the received signal, and then the first mode to determine its time parameters.

These two embodiments give satisfactory results in the lack of an interfering signal. In this description, an interfering signal is a signal that manifests itself by an interfering line in the received signal spectrum. In such a situation, the result of the method of determination according to the invention can be incorrect, depending on the power of the interfering line.

In order to guard against this type of error, it is foreseen to filter the received signal firstly before calculating the cyclic correlation coefficients.

According to a first variant, the filter is a pass band filter centred on the carrier frequency in the RF band or equivalently, around 0 in the base band. In the case of the UHF bands, for detection of DVB-T signals, a pass-band filter of a bandwidth of 4 MHz centred on the central frequency of the channel of interest or on 0 in baseband is advantageously chosen. This bandwidth is sufficient in practice to not modify the determination of the characteristic of the DVB-T signal using the method according to the invention. In general, a passband filter will be chosen to remove the interfering spectral line(s).

According to a second variant, the filter is an adaptive type rejection filter centred on the interfering spectral line(s) to be removed.

According to a third variant, the filtering of the sampled signal can be performed by using a decimation filter. The decimation filter will be chosen to remove the interfering spectral lines. For example, if the baseband signal exhibits a band [−4 MHz 4 MHz] and has been sampled at the Nyquist frequency (8 MHz) and if the interfering spectral line is determined to be at 2 MHz, a decimation rate of 4 will be chosen. The sampled signal thus decimated is therefore within the band [−1 MHz +1 MHz] and does not meet the Nyquist criterion anymore. However, the wrapping of the interfering spectral line, due do the undersampling, occurs onto the zero frequency. More generally, if the interfering line is located at $\pm f_{int}$ in the band [−B,+B] of the baseband signal, sampling will be at frequency $f_{int}$, i.e. decimation filtering will be performed at the rate $2B/f_{int}$ for finally obtaining a signal in the band $[-f_{int}, +f_{int}]$.

The wrapping onto the zero frequency of the images of the interfering spectral lines does not affect the cyclostationnarity properties of the signal.

To determine the interfering spectral line(s), the first step is to calculate the spectral density of the received signal, e.g. by calculating the square modulus of the Fourier transform of the received signal (FFT). The next step is to determine the average $m_s$ and the variance as of this spectral density, and the points $P_v$ of the spectrum for which the value of spectrally density exceeds $m_s+\lambda\sigma_s$, where $\lambda$ is a real greater than 1, and typically equal to or of the order of 3, are identified. A search is made to the right and left of each of these points $P_v$, for the points for which the amplitude is approximately equal to the average $m_s$, namely $P_v^-$ and $P_v^+$. The received signal is then filtered by a cascade of elementary filters rejecting the different bands $[P_v^-, P_v^+]$, or equivalently, by a single filter with a transfer function that is the convolution of the transfer functions of these elementary filters.

Regardless of the variant of the filter used, the cyclic correlation coefficients are calculated from the received signal thus filtered.

The invention claimed is:

1. Method of using a terminal of a cognitive radio system to determine the presence of an OFDM signal within a signal the terminal has received, the method comprising:

calculating, by the terminal, a plurality of cyclic correlation coefficients ($\rho^{k/(\alpha+\beta)}(\alpha)$) for the received signal for a correlation time difference ($\alpha$) and a plurality of cyclic frequencies $$\left(\frac{k}{\alpha+\beta}\right);$$

calculating, by the terminal, a discrimination function as a function of an amplitude of said cyclic correlation coefficients;

determining, by the terminal, whether said OFDM signal is present by comparing at least one value of said discrimination function with a predetermined threshold value.

2. The method according to claim 1, wherein the discrimination function is a sum of the squares of said cyclic correlation coefficients.

3. The method according to claim 2, wherein the discrimination function is calculated using the following equation:

$$J(\tilde{\alpha}, \tilde{\beta}) = \sum_{k=0}^{K-1} \left| \frac{1}{U} \sum_{u=0}^{U-1} s(u) s^*(u - \tilde{\alpha}) e^{-2i\pi \frac{k}{\tilde{\alpha}+\tilde{\beta}}} \right|^2$$

where $s(u)$, $u=1, \ldots, U$ are samples of the received signal, sampled at sampling period $T_e$, $\tilde{\alpha}$ is a time difference expressed in sampling period(s), $\tilde{\beta}$ is a cyclic prefix duration expressed in sampling period(s), a summation on k being taken on said plurality of cyclic frequencies.

4. The method according to claim 2, wherein the discrimination function is calculated using the following equation:

$$J(\tilde{\alpha}, \tilde{\beta}) = \sum_{k=0}^{K-1} \left| \frac{1}{U} \sum_{u=0}^{U-1} s^*(u) s(u + \tilde{\alpha}) e^{-2i\pi \frac{k}{\tilde{\alpha}+\tilde{\beta}}} \right|^2$$

where $s(u)$, $u=1, \ldots, U$ are samples of the received signal, sampled at sampling period $T_e$, $\tilde{\alpha}$ is a time difference expressed in sampling period(s), $\tilde{\beta}$ is a cyclic prefix duration expressed in sampling period(s), a summation on k being taken on said plurality of cyclic frequencies.

5. The method according to claim 3 or 4 wherein a useful duration and the cyclic prefix duration of OFDM symbols in the OFDM signal are known a priori, the discrimination function is calculated for the value of $\tilde{\alpha}$ equal to said known useful duration and the value of $\tilde{\beta}$ is equal to said known value of the prefix duration, expressed in sampling period(s).

6. The method according to claim 3 or 4, wherein the discrimination function calculated for a set of possible discrete values of $\tilde{\alpha}$ and/or $\tilde{\beta}$.

7. The method according to claim 3 or 4, wherein the discrimination function is calculated for an interval of values of $\tilde{\alpha}$ and/or $\tilde{\beta}$.

8. The method according to claim 5, wherein said at least one value of the discrimination function is compared with said predetermined threshold value, and it is then concluded that there is an OFDM signal present if it exceeds the threshold value, and otherwise that there is no OFDM signal.

9. The method according to claim 6, wherein a maximum of the discrimination function thus calculated is determined, this maximum is compared with said predetermined threshold value and it is then concluded that an OFDM signal is present if this maximum exceeds the threshold value, and otherwise that there is no OFDM signal.

10. The method according to claim 8, wherein the predetermined threshold value is calculated as a function of the $$\frac{U}{\sigma^4}$$

ratio where K is the number of cyclic frequencies and $$\sigma^2 = \frac{1}{U} \sum_{u=0}^{U-1} |x(u)|^2.$$

11. Method of using a terminal of a cognitive radio system to determine a time parameter of the OFDM signal in a signal the terminal has received, the method comprising:

calculating, by the terminal, a plurality of cyclic correlation coefficients ($\rho^{k/(\alpha+\beta)}(\alpha)$) for the received signal is calculated for a correlation time difference ($\alpha$) and a plurality of cyclic frequencies $$\left(\frac{k}{\alpha+\beta}\right);$$

calculating, by the terminal, a discrimination function as a function of an amplitude of said cyclic correlation coefficients;

determining, by the terminal, a time parameter of said OFDM signal as a function of at least one value of said discrimination function.

12. The method according to claim 11, wherein said time parameter is a useful length, a cyclic prefix length or a total length of OFDM symbols of said OFDM signal.

13. The method according to claim 12, wherein the useful length and the prefix length of the OFDM symbols are estimated jointly as the values $\tilde{\alpha} T_e$ and $\tilde{\beta} T_e$ respectively that achieve a maximum of the discrimination function.

14. The method according to claim 12, wherein the discrimination function is a sum of the squares of said cyclic correlation coefficients.

15. The method according to claim 14, wherein the discrimination function is calculated using the following equation:

$$J(\tilde{\alpha}, \tilde{\beta}) = \sum_{k=0}^{K-1} \left| \frac{1}{U} \sum_{u=0}^{U-1} s(u) s^*(u - \tilde{\alpha}) e^{-2i\pi \frac{k}{\tilde{\alpha}+\tilde{\beta}}} \right|^2$$

where $s(u)$, $u=1, \ldots, U$ are samples of the received signal, sampled at sampling period $T_e$, $\tilde{\alpha}$ is a time difference expressed in sampling period(s), $\tilde{\beta}$ is a cyclic prefix duration expressed in sampling period(s), a summation on k being taken on said plurality of cyclic frequencies.

16. The method according to claim 14, wherein the discrimination function is calculated using the following equation:

$$J(\tilde{\alpha}, \tilde{\beta}) = \sum_{k=0}^{K-1} \left| \frac{1}{U} \sum_{u=0}^{U-1} s^*(u) s(u + \tilde{\alpha}) e^{-2i\pi \frac{k}{\tilde{\alpha}+\tilde{\beta}}} \right|^2$$

where $s(u)$, $u=1, \ldots, U$ are samples of the received signal, sampled at sampling period $T_e$, $\tilde{\alpha}$ is a time difference expressed in sampling period(s), $\tilde{\beta}$ is a cyclic prefix duration expressed in sampling period(s), a summation on k being taken on said plurality of cyclic frequencies.

17. The method according to claim 15 or 16, wherein a maximum of the discrimination function is calculated for a plurality of possible discrete values of $\tilde{\alpha}$ and/or $\tilde{\beta}$.

18. The method according to claim 15 or 16, wherein a maximum of the discrimination function is calculated for an interval of values of $\tilde{\alpha}$ and/or $\tilde{\beta}$.

19. The method according to any of claims 1-4, 11, 12 or 14-16, wherein the received signal is first submitted to a filtering step for removing at least one interfering spectral line before calculating said plurality of cyclic correlation coefficients.

\* \* \* \* \*

UNITED STATES PATENT AND TRADEMARK OFFICE
CERTIFICATE OF CORRECTION

| | | |
|---|---|---|
| PATENT NO. | : 8,254,474 B2 | Page 1 of 1 |
| APPLICATION NO. | : 12/129937 | |
| DATED | : August 28, 2012 | |
| INVENTOR(S) | : Pierre Jallon | |

It is certified that error appears in the above-identified patent and that said Letters Patent is hereby corrected as shown below:

Title page, Item [54] and Column 1, Line 2 in the title delete "CHARACTERISTCS" and insert therefor --CHARACTERISTICS--

Column 7 line 44, delete ",-1" and insert therefor --K-1--

Column 10 line 26, delete "2" and insert therefor -- -2--

Column 10 line 44, after the word "variance" please insert --$\sigma$s--

Signed and Sealed this
Thirteenth Day of November, 2012

David J. Kappos
*Director of the United States Patent and Trademark Office*